(12) United States Patent
Li et al.

(10) Patent No.: US 6,777,499 B2
(45) Date of Patent: Aug. 17, 2004

(54) MULTIBLOCK INTERPOLYMERS AND PROCESSES FOR THE PREPARATION THEREOF

(75) Inventors: Yang Li, Beijing (CN); Dingyi Hong, Beijing (CN); Mingchu Gu, Dalian (CN); Jinzong Yang, Dalian (CN); Yurong Wang, Dalian (CN); Hongde Xu, Beijing (CN); Xingjun Lu, Beijing (CN); Li Yang, Beijing (CN); Jian Ding, Beijing (CN); Zhanxia Lv, Beijing (CN); Yongjun Lu, Beijing (CN); Yuchun Song, Beijing (CN)

(73) Assignees: China Petroleum & Chemical Corporation, Beijing (CN); Research Institute of Beijing Yanshan Petro Chemical Co. Ltd., Beijing (CN)

( * ) Notice: Subject to any disclaimer, the term of this patent is extended or adjusted under 35 U.S.C. 154(b) by 0 days.

(21) Appl. No.: 10/152,184

(22) Filed: May 20, 2002

(65) Prior Publication Data

US 2003/0013826 A1 Jan. 16, 2003

Related U.S. Application Data

(63) Continuation-in-part of application No. 09/640,470, filed on Aug. 16, 2000, now abandoned.

(30) Foreign Application Priority Data

| Feb. 17, 2000 | (CN) | 00100846 A |
| Feb. 17, 2000 | (CN) | 00100847 A |
| Feb. 17, 2000 | (CN) | 00100848 A |
| Feb. 17, 2000 | (CN) | 00100849 A |
| Feb. 17, 2000 | (CN) | 00100850 A |

(51) Int. Cl.$^7$ .................. C08F 293/00; C08F 297/04
(52) U.S. Cl. .................. 525/250; 525/313; 525/315; 525/256; 525/258; 525/259
(58) Field of Search .................. 525/250, 256, 525/258, 259, 313, 315

(56) References Cited

U.S. PATENT DOCUMENTS

| 5,070,148 A | 12/1991 | Hsu et al. |
| 5,100,965 A | 3/1992 | Hsu et al. |
| 5,986,010 A | 11/1999 | Clites et al. |

*Primary Examiner*—Caixia Lu
(74) *Attorney, Agent, or Firm*—Christie, Parker & Hale, LLP

(57) ABSTRACT

The present invention relates to multiblock interpolymers having the following symmetric structures and processes for their preparation: Y-X-Y, wherein Y represents a block of a random copolymer of conjugated diene and monovinyl aromatic monomer; and X represents a block of butadiene homopolymer, a block of isoprene homopolymer, or a block of butadiene/isoprene copolymer, and processes for the preparation thereof. The present multiblock interpolymers have in the same molecule both a rubber block of random copolymer of conjugated diene and monovinyl aromatic monomer and a rubber block selected from blocks of butadiene homopolymer, isoprene homopolymer and butadiene/isoprene copolymers, and hence possess excellent properties of the both two kinds of rubbers, and can be used widely as integrated rubber materials with excellent property balance, the present processes can simply prepare the above integrated rubber material in situ in a single reactor.

14 Claims, No Drawings

MULTIBLOCK INTERPOLYMERS AND PROCESSES FOR THE PREPARATION THEREOF

CROSS REFERENCE

The present application is a continuation-in-part of U.S. application Ser. No. 09/640,470, filed on Aug. 16, 2002, the disclosure of which is incorporated herein by reference.

FIELD OF THE INVENTION

The present invention relates to multiblock interpolymers of conjugated diene and monovinyl aromatic monomer and processes for the preparation thereof. More particularly, the present invention relates to multiblock interpolymers having the following symmetric structures:

Y-X-Y wherein Y represents a block of a random copolymer of conjugated diene and monovinyl aromatic monomer; and X represents a block of butadiene homopolymer, a block of isoprene homopolymer, or a block of butadiene/isoprene copolymer.

BACKGROUND OF THE INVENTION

Generally, representative block interpolymers based on butadiene, isoprene and styrene are SBS and SIS, wherein SBS is butadiene/styrene triblock copolymers (wherein B represents polybutadiene block and S represents polystyrene block), and SIS is isoprene/styrene triblock copolymers (wherein I represents polyisoprene block and S represents polystyrene block). By employing difunctional lithium based initiators and changing the charging orders of butadiene, isoprene and styrene, block interpolymers having various different structures can be obtained. Such block interpolymers comprise those having the following symmetric structures: (1) S-I-B-I-S (wherein butadiene, isoprene and styrene are charged sequentially); (2) S-B-I-B-S (wherein isoprene, butadiene and styrene are charged sequentially); (3) S-I-BI-B-BI-I-S (wherein butadiene and isoprene are charged simultaneously at first, and then styrene is charged); (4) S-BS-B-I-B-BS-S (wherein isoprene is charged at first, and then butadiene and styrene are charged simultaneously); (5) S-IS-I-B-I-IS-S (wherein butadiene is charged at first, and then isoprene and styrene are charged simultaneously); (6) S-IS-I-BI-I-BI-I-IS-S (wherein butadiene, isoprene and styrene are charged simultaneously), in the above formula, S represents a polystyrene block, B represents a polybutadiene block, I represents a polyisoprene block, BI represents a block of tapered copolymer of butadiene and isoprene, BS represents a block of tapered copolymer of butadiene and styrene, and IS represents a block of tapered copolymer of isoprene and styrene.

U.S. Pat. No. 5,100,965 to Hsu et al. disclosed a process to synthesize polymers having high trans microstructure content of about 60% to about 85%. The polymers obtained therefrom include high trans-1,4-polybutadiene, styrene-isoprene-butadiene terpolymers with high trans-1,4-polybutadiene microstructure, high trans-isoprene-butadiene copolymers and styrene-butadiene copolymers having high trans-1,4-polybutadiene microstructure. As is know in the art, trans-1,4-polybutadiene is not a rubber, but a thermoplastic resin by virtue of its high level of crystallinity. The high trans styrene-butadiene, styrene-isoprene-butadiene, isoprene-butadiene copolymers prepared by the process in '965 patent all have high level of crystalline structure and have melting points within the range of about −20° C. to about 40° C. As stated in column 13 of '965 patent, though the segmented copolymers of its invention can be used to make tire tread compounds without the need to blend additional rubbers therein, it is desirable, in many cases, to blend the segmented copolymers with one or more additional rubbers, such as natural rubber or styrene-butadiene rubber, to attain the desired performance characteristics for the tire tread compound, such as good rolling resistance, tear resistance, traction, tread wear characteristics, and low temperature properties. In fact, such kind of material is seldom used alone as tire rubber. Also the glass transition temperature of the high trans styrene-butadiene, styrene-isoprene-butadiene, isoprene-butadiene copolymers prepared by the process in '965 patent is from about −60° C. to about −95° C. varying with their monomeric makeup. Such kind of materials cannot be of wide glass transition zone, instead, exhibit narrow glass transition zone. It is well known that wide glass transition zone is indicative of an integrated rubber of excellent property balance.

The preparation process disclosed '965 patent needs to utilize a composite initiating system of complicated composition. Besides at least one organolithium initiator, an organoaluminum compound, a barium alkoxide and a lithium alkoxide are necessarily used in the initiating system.

U.S. Pat. No. 5,070,148 to Hsu et al. disclosed a rubber polymer for use in making tire treads, which is prepared by utilizing organo monolithium compounds. The rubber polymer is only a two-segment copolymer and of asymmetric structure. As stated in the patent, the object of its invention is to provide a tire tread material exhibiting excellent combination of wet skid resistance and low rolling resistance that is highly desirable for tires. It is well known in the art that low tan delta value at 60° C. is indicative of good rolling resistance of tire treads and high tan delta value at 0° C. is indicative of good traction characteristic (wet skid resistance). The loss angle tan delta at 60° C. reported in Example 1 of the '148 patent is 0.130; its loss angle tan delta at 0° C. reported in Example 1 is 0.306.

The object of the present invention is to provide novel multiblock interpolymers of conjugated diene and monovinyl aromatic monomer, which have in the same molecule both a rubber block of random copolymer of conjugated diene and monovinyl aromatic monomer and a rubber block selected from blocks of butadiene homopolymer, isoprene homopolymer and butadiene/isoprene copolymer, and hence possess excellent properties of the both two kinds of rubbers.

The inventive multiblock interpolymers are energy-saving rubber materials for using as tire tread rubber, which have very low loss angle tan delta value at 60° C. and thus undergo very low energy loss. Also, such multiblock interpolymers all exhibit wide glass transition zone indicative of an integrated rubber of excellent property balance. Further, such multiblock interpolymers contain no considerable crystalline structure and thus can be used alone as tire tread materials, without the need to blend with one or more additional rubbers to attain desired property balance. The present inventive rubber materials have excellent balance of good wet skid resistance and very low rolling resistance, as well as good low temperature properties, and thus are integrated rubber of excellent comprehensive properties.

Another object of the present invention is to provide processes for the preparation of the novel multiblock interpolymers, it can prepare the above integrated rubber material in situ in a single reactor instead of physically blending.

The present preparation process utilizes simple one-component initiating system, without the need of adding other components, such as an organoaluminum compound, a barium alkoxide and a lithium alkoxide, as coinitiator.

SUMMARY OF THE INVENTION

Therefore, in one aspect the present invention relates to multiblock interpolymers having the following symmetric structures:

Y-X-Y wherein Y represents a block of a random copolymer conjugated diene and monovinyl aromatic monomer, wherein the content of the 1,2- or 3,4-addition polymerization structure of the conjugated diene in block Y is from 10 to 50 percent by weight, based on the total weight of the units derived from the conjugated diene in block Y; and X represents a block of butadiene homopolymer, a block of isoprene homopolymer, or a block of butadiene/isoprene copolymer, wherein the content of 3,4-addition polymerization structure of isoprene in block X is, based on the total weight of the units derived from the isoprene in block X, from 6 to 20 percent by weight, and/or the content of 1,2-addition polymerization structure of butadiene in block X is, based on the total weight of the units derived from the butadiene in block X, from 6 to 20 percent by weight.

In another aspect, the present invention relates to processes for the preparation of the present multiblock interpolymers by anionic polymerization.

In still another aspect, the present invention relates to use of the present multiblock interpolymers as elastomeric materials, such as tire tread materials.

DETAILED DESCRIPTION OF THE INVENTION

The follows will describe the present invention in detail.

In the present multiblock interpolymers, block X is a block of butadiene homopolymer, a block of isoprene homopolymer, or a block of butadiene/isoprene copolymer. Preferably, block X is a block having the following structure:

-B- or
-I-or
-I-B-I- or
-B-I-B or
-I-BI-B-BI-I-, wherein B represents a block of butadiene homopolymer, I represents a block of isoprene homopolymer, and BI represents a block of tapered copolymer of butadiene and isoprene.

Accordingly, the present multiblock interpolymers preferably are of the following structure;

Y-B-Y or
Y-I-Y or
Y-I-B-I-Y or
Y-B-I-B-Y or
Y-I-BI-B-BI-I-Y.

In block X, the content of 1,2-addition polymerization structure of the butadiene is preferably in the range of from 6 to 35 percent by weight, more preferably from 10 to 20 percent by weight, based on the total weight of the units derived from the butadiene in block X, and the content of 3,4-addition polymerization structure of isoprene is in the range of from 6 to 35 percent by weight, more preferably from 10 to 20 percent by weight, based on the total weight of the units derived from the isoprene in block X. When block X is a block of butadiene/isoprene copolymer, for example, when block X is -I-B-I-, -B-I-B- or -I-BI-B-BI-I, the weight ratio of butadiene to isoprene is preferably from 10/90 to 90/10, more preferably from 30/70 to 70/30.

In the present multiblock interpolymers, block Y is a block of random copolymer of conjugated diene and monovinyl aromatic monomer. Suitable monomers are any conjugated diene and monovinyl aromatic monomer from which the random copolymer rubber block can be obtained. The conjugated diene monomer is preferably a $C_4$–$C_6$ conjugated diene, such as butadiene, isoprene, 1,3-pentadiene, 1,3-hexadiene, 2,3-dimethylbutadiene, and mixtures thereof, more preferably butadiene and isoprene, most preferably butadiene. The monovinyl aromatic monomer which is preferred in block Y includes styrene or alkyl substituted styrene such as vinyl toluene (all isomers), α-methylstyrene, 4-tertiary-butylstyrene, 4-methylstyrene, 3,5-diethylstyrene, 3,5-di-n-butylstyrene, 4-n-propylstyrene, 4-dodecylstyriene and mixtures thereof. More preferably, the monovinyl aromatic monomer is styrene, vinyltoluene, α-methylstyrene and mixtures thereof, with styrene being most preferred. In block Y, the content of the recurring unit derived from the monovinyl aromatic monomer is generally 10 to 50 percent by weight, preferably 15 to 35 percent by weight, based on the total weight of block Y; and correspondingly, the content of the recurring unit derived from the conjugated diene is generally 50 to 90 percent by weight, preferably 65 to 85 percent by weight. In block Y, the content of 1,2- or 3,4-addition polymerization structure for the polymerized conjugated dienes is preferably 6 to 80 percent by weight, more preferably 10 to 50 percent by weight, based on the total weight of the units derived from the conjugated diene in block Y.

In the present multiblock interpolymers, the weight ratio of the total blocks Y to block X is preferably 10/90 to 90/10, more preferably 30/70 to 70/30.

Preferably, the present multiblock interpolymers have a number average molecular weight (Mn), determined by Gel Permeation Chromatography (GPC) method) of $5 \times 10^4$ to $35 \times 10^4$, and most preferably $10 \times 10^4$ to $25 \times 10^4$.

The present multiblock interpolymers can be prepared by anionic polymerization process under conventional conditions. In one preferred embodiment, the preparation process thereof comprises the steps of a) anionic polymerizing butadiene and/or isoprene in a non-polar hydrocarbon solvent in presence of a difunctional lithium based initiator, till the butadiene and/or isoprene are polymerized completely, to form block X; and then b) charging a mixture of conjugated diene and monovinyl aromatic monomer into the reaction mixture obtained in step a) above, continuing the anionic polymerization in presence of a polar modifier till the polymerization is complete, to form block Y.

Clearly, the present process is anionic solution polymerization process utilizing a difunctional lithium initiator to prepare a rubber polymer with symmetric block structure. The trans microstructure contents in the polybutadiene or polyisoprene obtained in the present process are roughly equal to their cis microstructure contents. As indicated above, the content of 3,4-addition polymerization structure of isoprene in block X is 6–35 percent by weight based on the total weight of the units derived from the isoprene in block X, and/or the content of 1,2-addition polymerization structure of butadiene in block X is 6–35 percent by weight based on the total weight of the units derived from the butadiene in block X; the content of the 1,2- or 3,4-addition polymerization structure of the conjugated diene in block Y is from 10–50 percent by weight based on the total weight of the units derived from the conjugated diene in block Y. Thus the present multiblock interpolymers cannot have a trans microstructure content as high as that in '965 patent. In particular, its trans microstructure content therein is not more than 55 percent by weight; its cis microstructure content therein is not more than 39 percent by weight, with the remaining microstructure being 1,2- and/or 3,4- addition polymerization structure. The present multiblock interpolymers thus contain no considerable crystalline structure (no detectable melting points) and can be used alone as tire tread materials, without the need to blend with one or more additional rubbers to attain desired property balance.

Depending on the specific structure of block X, step a) of the present process can particularly be: (1) when block X is -B-, butadiene is polymerized in step a); (2) when block X is -I-, isoprene is polymerized in step a); (3) when block X is -I-B-I-, in step a) butadiene is first polymerized completely, and then isoprene is charged and polymerized completely; (4) when block X is -B-I-B-, in step a) isoprene is first polymerized completely, and then butadiene is charged and polymerized completely; (5) when block X is -I-BI-B-BI-I-, in step a) a mixture of butadiene and isoprene is charged to a non-polar hydrocarbon solvent and polymerized completely.

More particularly, the multiblock interpolymer Y-B-Y of the present invention can be prepared as follows. Butadiene, in an amount to provide the desired composition of the final interpolymer, is charged to a non-polar hydrocarbon solvent in a reactor, optionally a polar modifier is charged depending upon the desired microstructure of polybutadiene, and the kind and amount of the polar modifier is dependent on the desired content of 1,2-addition polymerization structure in the polybutadiene block -B-. The monomer concentration is 10 to 20 percent by weight. After the initiating temperature, which is generally about 30 to 80° C., is reached, a difunctional lithium based initiator is charged in an amount to provide the desired molecular weight of the interpolymer. The difunctional lithium based initiator can be a single difunctional lithium based initiator or a mixture of several difunctional lithium based initiators, and generally is at least one selected from the group consisting of bislithiums derived from dihalogenated alkanes and oligomeric bislithiums thereof, bislithiums of naphthalene, and bislithiums derived from diene compounds and oligomeric bislithiums thereof. After the butadiene is polymerized completely, a mixture of conjugated diene and monovinyl aromatic monomer containing a polar modifier is charged to the reactor to prepare block Y, the conjugated diene and the monovinyl aromatic monomer are used in such amounts to provide the desired weight ratio of the conjugated diene to the monovinyl aromatic monomer in block Y. The object of use of the polar modifier is to adjust the copolymerization reactivity ratio of the conjugated diene to the monovinyl aromatic monomer, achieve the random copolymerization of the conjugated diene and the monovinyl aromatic monomer, and obtain the random copolymer block Y. The polar modifier shall be used in an amount sufficiently to make the conjugated diene and the monovinyl aromatic monomer copolymerize randomly, and the amount of the polar modifier used can be varied within a wide range depending upon the kind of the polar modifier employed. After the conjugated diene and the monovinyl aromatic monomer are polymerized completely, the polymerization is terminated and the resulted polymer product is recovered in conventional ways.

More particularly, the multiblock interpolymer Y-I-Y of the present invention can be prepared as follows. Isoprene, in an amount to provide the desired composition of the final interpolymer, is charged to a non-polar hydrocarbon solvent in a reactor, optionally a polar modifier is charged depending upon the desired microstructure of polyisoprene, and the kind and amount of the polar modifier is dependent on the desired content of 3,4-addition polymerization structure in the polyisoprene block -I-. The monomer concentration is 10 to 20 percent by weight. After the initiating temperature, which is generally about 30 to 80° C., is reached, a difunctional lithium based initiator is charged in an amount to provide the desired molecular weight of the interpolymer. The difunctional lithium based initiator can be a single difunctional lithium based initiator or a mixture of several difunctional lithium based initiators, and generally is at least one selected from the group consisting of bislithiums derived from dihalogenated alkanes and oligomeric bislithiums thereof, bislithiums of naphthalene, and bislithiums derived from diene compounds and oligomeric bislithiums thereof. After the isoprene is polymerized completely, a mixture of conjugated diene and monovinyl aromatic monomer containing a polar modifier is charged to the reactor to prepare block Y, the conjugated diene and the monovinyl aromatic monomer are used in such amounts to provide the desired weight ratio of the conjugated diene to the monovinyl aromatic monomer in block Y. The object of use of the polar modifier is to adjust the copolymerization reactivity ratio of the conjugated diene to the monovinyl aromatic monomer, achieve the random copolymerization of the conjugated diene and the monovinyl aromatic monomer, and obtain the random copolymer block Y. The polar modifier shall be used in an amount sufficiently to make the conjugated diene and the monovinyl aromatic monomer copolymerize randomly, and the amount of the polar modifier used can be varied within a wide range depending upon the kind of the polar modifier employed. After the conjugated diene and the monovinyl aromatic monomer are polymerized completely, the polymerization is terminated and the resulted polymer product is recovered in conventional ways.

More particularly, the multiblock interpolymer Y-I-B-I-Y of the present invention can be prepared as follows. Butadiene, in an amount to provide the desired composition of the final interpolymer, is charged to a non-polar hydrocarbon solvent in a reactor, optionally a polar modifier is charged depending upon the desired microstructure of polybutadiene, and the kind and amount of the polar modifier is dependent on the desired content of 1,2-addition polymerization structure in the polybutadiene block -B-. The monomer concentration is 10 to 20 percent by weight. After the initiating temperature, which is generally about 30 to 80° C., is reached, a difunctional lithium based initiator is charged, in an amount to provide the desired molecular weight of the interpolymer, to prepare block -B-. The difunctional lithium based initiator can be a single difunctional lithium based initiator or a mixture of several difunctional lithium based initiators, and generally is at least one selected from the group consisting of bislithiums derived from dihalogenated alkanes and oligomeric bislithiums thereof, bislithiums of naphthalene, and bislithiums derived from diene compounds and oligomeric bislithiums thereof.

After complete polymerization of the butadiene, isoprene in suitable amount is charged to prepare block -I-. After the isoprene is polymerized completely, a mixture of conjugated diene and monovinyl aromatic monomer containing a polar modifier is charged to the reactor to prepare block Y, the conjugated diene and the monovinyl aromatic monomer are used in such amounts to provide the desired weight ratio of the conjugated diene to the monovinyl aromatic monomer in block Y. The object of use of the polar modifier is to adjust the copolymerization reactivity ratio of the conjugated diene to the monovinyl aromatic monomer, achieve the random copolymerization of the conjugated diene and the monovinyl aromatic monomer, and obtain the random copolymer block Y. The polar modifier shall be used in an amount sufficiently to make the conjugated diene and the monovinyl aromatic monomer copolymerize randomly, and the amount of the polar modifier used can be varied within a wide range depending upon the kind of the polar modifier employed. After the conjugated diene and the monovinyl aromatic monomer are polymerized completely, the polymerization is terminated and the resulted polymer product is recovered in conventional ways.

More particularly, the multiblock interpolymer Y-B-I-B-Y of the present invention can be prepared as follows. Isoprene, in an amount to provide the desired composition of the final interpolymer, is charged to a non-polar hydrocarbon solvent in a reactor, optionally a polar modifier is charged depending upon the desired microstructure of polyisoprene, and the kind and amount of the polar modifier is dependent on the desired content of 3,4-addition polymerization structure in the polyisoprene block -I-. The monomer concentration is 10 to 20 percent by weight. After the initiating temperature, which is generally about 30 to 80° C., is reached, a difunctional lithium based initiator is charged, in an amount to provide the desired molecular weight of the interpolymer, to prepare block -I-. The difunctional lithium based initiator can be a single difunctional lithium based initiator or a mixture of several difunctional lithium based initiators, and generally is at least one selected from the group consisting of bislithiums derived from dihalogenated alkanes and oligomeric bislithiums thereof, bislithiums of naphthalene, and bislithiums derived from diene compounds and oligomeric bislithiums thereof. After complete polymerization of the isoprene, butadiene in suitable amount is charged to prepare block -B-. After the butadiene is polymerized completely, a mixture of conjugated diene and monovinyl aromatic monomer containing a polar modifier is charged to the reactor to prepare block Y, the conjugated diene and the monovinyl aromatic monomer are used in such amounts to provide the desired weight ratio of the conjugated diene to the monovinyl aromatic monomer in block Y. The object of use of the polar modifier is to adjust the copolymerization reactivity ratio of the conjugated diene to the monovinyl aromatic monomer, achieve the random copolymerization of the conjugated diene and the monovinyl aromatic monomer, and obtain the random copolymer block Y. The polar modifier shall be used in an amount sufficiently to make the conjugated diene and the monovinyl aromatic monomer copolymerize randomly, and the amount of the polar modifier used can be varied within a wide range depending upon the kind of the polar modifier employed. After the conjugated diene and the monovinyl aromatic monomer are polymerized completely, the polymerization is terminated and the resulted polymer product is recovered in conventional ways.

More particularly, the multiblock interpolymer Y-I-BI-B-BI-I-Y of the present invention can be prepared as follows. Butadiene and isoprene, in amounts respectively to provide the desired composition of the final interpolymer, are simultaneously charged to a non-polar hydrocarbon solvent in a reactor, optionally a polar modifier is charged depending upon the desired microstructure of polybutadiene and polyisoprene, and the desired length of the tapered block BI, and the kind and amount of the polar modifier is dependent on the desired content of 1,2-addition polymerization structure in the polybutadiene block and of 3,4-addition polymerization structure in the polyisoprene block. The monomer concentration is 10 to 20 percent by weight. After the initiating temperature, which is generally about 30 to 80° C., is reached, a difunctional lithium based initiator is charged, in an amount to provide the desired molecular weight of the interpolymer. The difunctional lithium based initiator can be a single difunctional lithium based initiator or a mixture of several difunctional lithium based initiators, and generally is at least one selected from the group consisting of bislithiums derived from dihalogenated alkanes and oligomeric bislithiums thereof, bislithiums of naphthalene, and bislithiums derived from diene compounds and oligomeric bislithiums thereof. After the butadiene and isoprene are polymerized completely, a mixture of conjugated diene and monovinyl aromatic monomer containing a polar modifier is charged to the reactor to prepare block Y, the conjugated diene and the monovinyl aromatic monomer are used in such amounts to provide the desired weight ratio of the conjugated diene to the monovinyl aromatic monomer in block Y. The object of use of the polar modifier is to adjust the copolymerization reactivity ratio of the conjugated diene to the monovinyl aromatic monomer, achieve the random copolymerization of the conjugated diene and the monovinyl aromatic monomer, and obtain the random copolymer block Y. The polar modifier shall be used in an amount sufficiently to make the conjugated diene and the monovinyl aromatic monomer copolymerize randomly, and the amount of the polar modifier used can be varied within a wide range depending upon the kind of the polar modifier employed. After the conjugated diene and the monovinyl aromatic monomer are polymerized completely, the polymerization is terminated and the resulted polymer product is recovered in conventional ways.

The polar modifier suitable for the present process is at least one from the group of consisting of oxygen-, nitrogen-, sulfur-, or phosphorus-containing polar compounds and metal alkoxides, the specific examples include (1) oxygen containing compounds such as diethyl ether, tetrahydrofuran, a compound represented by $R^1OCH_2CH_2OR^2$ (wherein $R^1$ and $R^2$, being the same or different, represent an alkyl having 1 to 6 carbon atoms, preferably $R^1$ is different from $R^2$, for example, glycol dimethyl ether, glycol diethyl ether), a compound represented by $R^1OCH_2CH_2OCH_2CH_2OR^2$ (wherein $R^1$ and $R^2$, being the same or different, represent an alkyl having 1 to 6 carbon atoms, preferably $R^1$ is different from $R^2$, for example, diglycol dimethyl ether, diglycol dibutyl ether), and crown ether; (2) nitrogen-containing compounds such as triethylamine, tetramethyl ethylene diamine (TMEDA), dipiperidino ethane (DPE), preferably TMEDA; (3) phosphorus-containing compounds such as hexamethyl phosphoric triamide (HMPA); (4) metal alkoxides represented by ROM, wherein R represents a alkyl having 1 to 6 carbon atoms, O represents oxygen atom, and M represents an metal cation such as sodium cation ($Na^+$) and potassium cation ($K^+$), preferably potassium tert-butoxide and sodium tert-amyloxide.

The solvent suitable for the present process includes non-polar hydrocarbon solvents, selected from the group consisting of non-polar aromatic hydrocarbons, non-polar aliphatic hydrocarbons and mixtures thereof. Examples of the solvent include benzene, toluene, ethylbenzene, xylene, pentane, hexane, heptane, octane, cyclohexane, mixed arene such as mixed xylene, mixed aliphatic hydrocarbon such as raffinate oil or mixtures thereof The solvent is preferably hexane, cyclohexane and raffinate oil.

The initiator useful in the present invention is a difunctional lithium based initiator, selected from the group consisting of bislithiums derived from dihalogenated alkanes and oligomeric bislithiums thereof, having the general formulae LiRLi and Li(DO)$_n$R(DO)$_n$Li, respectively, wherein R represents an alkylene group having from 4 to 10 carbon atoms, DO represents a conjugated diene having from 4 to 8 carbon atoms or mixtures thereof, with 1,3-butadiene and isoprene being preferred, and n represents the oligomerization degree, typically ranging from 2 to 8, preferably from 3 to 6, the bislithiums derived from dihalogenated alkanes and oligomeric bislithiums thereof are preferably 1,4-dilithiobutane, 1,2-dilithio-1,2-diphenylethane, 1,4-dilithio-1,1,4,4-tetraphenyl-butane, 1,4-dilithio-1,4-dimethyl-1,4-diphenyl-butane and isoprene oligomer-bislithiums and butadiene oligomer-bislithiums thereof, and any mixture thereof, bislithiums of naphthalene, such as dilithionaphthalene and α-methyl-dilithio-naphthalene and mixture thereof; and bislithiums derived from diene compounds and oligomeric bislithiums thereof, for example, 1,3-phenylene-bis[3-methyl-1-(4-methyl)-phenylpentylidene]bislithium, 1,3-phenylene-bis[3-methyl-1-(4-methyl)phenyl-pentylidene] butadiene oligomer-bislithium, 1,3-phenylene-bis[3-methyl-1-(4-methyl)phenylpentylidene] isoprene oligomer-bislithium, 1,4-phenylene-bis[3-methyl-1-(4-methyl) phenylpentylidene]bis-lithium, 1,4-phenylene-bis[3-methyl-1-(4-methyl) phenylpentylidene]butadiene oligomer-bislithium, and 1,4-phenylene-bis[3-methyl-1-(4-methyl)phenyl-pentylidene]isoprene oligomer-bislithium, and any mixture thereof.

The amount of the initiator used depends on the desired molecular weight of the multiblock interpolymers. In the present invention, the difunctional lithium based initiator is preferably used in such an amount that the multiblock interpolymers have a number average molecular weight of $5 \times 10^4$ to $35 \times 10^4$.

Optionally, conventional additives and fillers, such as antioxidant, can be added into the present multiblock interpolymers, for example Irganox 1010 (trade name, available from Ciba-Geigy AG, Switzerland) and ANTIGENE BHT (trade name, 2,6-di-tertiary-butyl-4-methylphenol, available from Sumitomo Chemical Co., Ltd., Japan) and mixture thereof.

The present invention is further illustrated by the following examples, which shall not be construed as limited.

EXAMPLE 1

Into a 5-liter stainless steel reactor equipped with a stirrer and a heater are added 3.5 liters of cyclohexane and 140 grams of butadiene. The reactor is heated to 50° C. and 24.6 ml (0.095M of solution in toluene) of a difunctional lithium based initiator, 1,3-phenylene-bis[3-methyl-1-(4-methyl) phenyl pentylidene]bislithium is added thereto. The polymerization of the butadiene is completed after 30 minutes. Next, to the reaction mixture are added 175 grams of butadiene, 35 grams of styrene and the polar modifier TMEDA with the molar ratio of TMEDA/Li being 1.0, and the reaction is continued for 60 minutes. After the butadiene and styrene are polymerized completely, 3.5 grams of antioxidant (a mixture of Irganox 1010 and ANTIGENE BHT in a weight ratio of 1:1) is added, then the polymer product is recovered by conventional methods. The resultant polymer has a number average molecular weight of $15 \times 10^4$. After being dried, the polymer samples are measured for their structural and mechanical properties by conventional methods and the results are shown in Table 1.

EXAMPLES 2–7

The procedure similar to Example 1 is followed, except that the amounts of the butadiene and styrene, and the kind and amount of the polar modifier are changed, so as to prepare triblock interpolymers Y-B-Y. The polymerization conditions, the structures and properties obtained are shown in Table 1 as Examples 2–7.

TABLE 1

Polymerization conditions and physical properties of the resulting products

| Examples | 1 | 2 | 3 | 4 | 5 | 6 | 7 |
|---|---|---|---|---|---|---|---|
| S(g) | 35 | 105 | 105 | 35 | 70 | 70 | 70 |
| B1(g) | 140 | 105 | 70 | 105 | 70 | 140 | 105 |
| B2(g) | 175 | 140 | 175 | 210 | 210 | 140 | 175 |
| Ai | TMEDA | THF | THF | 2G | THF | THF | TMEDA |
| Ai/Li | 1.0 | 6 | 8 | 0.5 | 35 | 40 | 0.5 |
| Cis-1,4-B % in block Y | 18 | 33 | 32 | 16 | 29 | 27 | 25 |
| Trans-1,4-B % in block Y | 30 | 42 | 40 | 27 | 39 | 38 | 35 |
| 1,2-B % in block Y | 52 | 25 | 28 | 57 | 32 | 35 | 40 |
| 1,2-B % in block B | 10 | 10 | 10 | 10 | 10 | 10 | 10 |
| Cis-1,4-B % in block B | 44 | 44 | 44 | 44 | 44 | 44 | 44 |
| Trans-1,4-B % in block B | 46 | 46 | 46 | 46 | 46 | 46 | 46 |
| Tg(° C.) | −55 | −30 | −50 | −58 | −52 | −40 | −43 |

Note: S is the amount of the styrene, B1 is the amount of the first charge of the butadiene, B2 is the amount of the second charge of the butadiene, Ai is the kind of the polar modifier, Ai/Li is the molar ratio of the polar modifier to the initiator, cis-1,4-B % is the weight percent of the cis-1,4-addition polymerization structure of butadiene, trans-1,4-B % is the weight percent of the trans-1,4-addition polymerization structure of butadiene, 1,2-B % is the weight percent of the 1,2-addition polymerization structure of butadiene, Tg is the glass transition temperature. THF is tetrahydrofuran, TMEDA is tetramethyl ethylene diamine, and 2G is diglycol dimethyl ether.

EXAMPLE 8

Into a 5-liter stainless steel reactor equipped with a stirrer and a heater are added 3.5 liters of cyclohexane and 140 grams of isoprene. The reactor is heated to 50° C. and 24.6 ml (0.095M of solution in toluene) of a difunctional lithium based initiator, 1, 3-phenylene-bis[3-methyl-1-(4-methyl) phenyl pentylidene]bislithium is added thereto. The polymerization of the isoprene is completed after 30 minutes. Next, to the reaction mixture are added 175 grams of butadiene, 35 grams of styrene and the polar modifier TMEDA with the molar ratio of TMEDA/Li being 1.0, and the reaction is continued for 60 minutes. After the butadiene and styrene are polymerized completely, 3.5 grams of antioxidant (a mixture of Irganox 1010 and ANTIGENE BHT in a weight ratio of 1:1) is added, then the polymer product is recovered by conventional methods. The resultant polymer has a number average molecular weight of $15 \times 10^4$. After being dried, the polymer samples are measured for their structural and mechanical properties by conventional methods and the results are shown in Table 2.

EXAMPLES 9–14

The procedure similar to Example 8 is followed, except that the amounts of the isoprene, butadiene and styrene, and the kind and amount of the polar modifier are changed, so as to prepare triblock interpolymers Y-I-Y. The polymerization conditions, the structures and properties obtained are shown in Table 2 as Examples 9–14.

grams of butadiene. The reactor is heated to 50° C. and 24.6 ml (0.095M of solution in toluene) of a difunctional lithium based initiator, 1, 3-phenylene-bis[3-methyl-1-(4-methyl) phenyl pentylidene]bislithium is added thereto. The polymerization of the butadiene is completed after 30 minutes. Then, 70 grams of isoprene is added, and the polymerization of the isoprene is completed after 30 minutes. Next, to the reaction mixture are added 175 grams of butadiene, 35 grams of styrene and the polar modifier TMEDA with the molar ratio of TMEDA/Li being 1.0, and the reaction is continued for 60 minutes. After the butadiene and styrene are polymerized completely, 3.5 grams of antioxidant (a mixture of Irganox 1010 and ANTIGENE BHT in a weight ratio of 1:1) is added, then the polymer product is recovered by conventional methods. The resultant polymer has a number average molecular weight of $15 \times 10^4$. After being dried, the polymer samples are measured for their structural and mechanical properties by conventional methods and the results are shown in Table 3.

EXAMPLES 16–21

The procedure similar to Example 15 is followed, except that the amounts of the butadiene, isoprene and styrene, and the kind and amount of the polar modifier are changed, so as to prepare pentablock interpolymers Y-I-B-I-Y. The polymerization conditions, the structures and properties obtained are shown in Table 3 as Examples 16–21.

TABLE 2

Polymerization conditions and physical properties of the resulting products

| Examples | 8 | 9 | 10 | 11 | 12 | 13 | 14 |
|---|---|---|---|---|---|---|---|
| S(g) | 35 | 105 | 105 | 35 | 70 | 70 | 70 |
| I(g) | 140 | 105 | 70 | 105 | 70 | 140 | 105 |
| B(g) | 175 | 140 | 175 | 210 | 210 | 140 | 175 |
| Ai | TMEDA | THF | THF | TMEDA | THF | THF | TMEDA |
| Ai/Li | 1.0 | 6 | 8 | 1.2 | 35 | 40 | 0.5 |
| Cis-1,4-B % in block Y | 18 | 33 | 32 | 16 | 29 | 27 | 25 |
| Trans-1,4-B % in block Y | 30 | 42 | 40 | 27 | 39 | 38 | 35 |
| 1,2-B % in block Y | 52 | 25 | 28 | 57 | 32 | 35 | 40 |
| 1,4-I % in block I | 86 | 85 | 85 | 87 | 86 | 85 | 87 |
| 3,4-I % in block I | 14 | 15 | 15 | 13 | 14 | 15 | 13 |
| Tg (° C.) | −58 | −37 | −55 | −61 | −56 | −45 | −48 |

Note: S is the amount of the styrene, I is the amount of the isoprene, B is the amount of the butadiene, Ai is the kind of the polar modifier, Ai/Li is the molar ratio of the polar modifier to the initiator; cis-1,4-B %, trans-1,4-B % and 1,2-B % are the same as defined in Table 1, 1,4-I % is the weight percent of the 1,4-addition polymerization structure of isoprene, 3,4-I % is the weight percent of the 3,4-addition polymerization structure of isoprene, Tg is the glass transition temperature. THF is tetrahydrofuran, TMEDA is tetramethyl ethylene diamine.

EXAMPLE 15

Into a 5-liter stainless steel reactor equipped with a stirrer and a heater are added 3.5 liters of cyclohexane and 70

TABLE 3

Polymerization conditions and physical properties of the resulting products

| Examples | 15 | 16 | 17 | 18 | 19 | 20 | 21 |
|---|---|---|---|---|---|---|---|
| S(g) | 35 | 105 | 105 | 35 | 70 | 70 | 70 |
| I(g) | 70 | 45 | 35 | 65 | 30 | 70 | 35 |
| B1(g) | 70 | 60 | 35 | 40 | 40 | 70 | 70 |
| B2(g) | 175 | 140 | 175 | 210 | 210 | 140 | 175 |
| Ai | TMEDA | THF | THF | TMEDA | THF | THF | TMEDA |
| Ai/Li | 1.0 | 6 | 8 | 1.2 | 35 | 40 | 0.5 |
| cis-1,4-B % in block Y | 18 | 33 | 32 | 16 | 29 | 27 | 25 |
| Trans-1,4-B % in block Y | 30 | 42 | 40 | 27 | 39 | 38 | 35 |
| 1,2-B % in block Y | 52 | 25 | 28 | 57 | 32 | 35 | 40 |
| 1,2-B % in block X | 10 | 10 | 10 | 10 | 10 | 10 | 10 |

TABLE 3-continued

Polymerization conditions and physical properties of the resulting products

| Examples | 15 | 16 | 17 | 18 | 19 | 20 | 21 |
|---|---|---|---|---|---|---|---|
| cis-1,4-B % in block X | 44 | 44 | 44 | 44 | 44 | 44 | 44 |
| Trans-1,4-B % in block X | 46 | 46 | 46 | 46 | 46 | 46 | 46 |
| 1,4-I % in block X | 86 | 85 | 85 | 87 | 86 | 85 | 87 |
| 3,4-I % in block X | 14 | 15 | 15 | 13 | 14 | 15 | 13 |
| Tg (° C.) | −60 | −37 | −57 | −65 | −59 | −47 | −50 |

Note: S is the amount of the styrene, I is the amount of the isoprene, B1 is the amount of the first charge of the butadiene, B2 is the amount of the second charge of the butadiene, Ai is the kind of the polar modifier, Ai/Li is the molar ratio of the polar modifier to the initiator, cis-1, 4-B %, trans-1,4-B %, 1,2-B %, 1,4-I % and 3,4-I % are the same as defined above, Tg is the glass transition temperature. THF is tetrahydrofuran, TMEDA is tetramethyl ethylene diamine.

EXAMPLE 22

Into a 5-liter stainless steel reactor equipped with a stirrer and a heater are added 3.5 liters of cyclohexane and 70 grams of isoprene. The reactor is heated to 50° C. and 24.6 ml (0.095 M of solution in toluene) of a difunctional lithium based initiator, 1, 3-phenylene-bis[3-methyl-1-(4-methyl) phenyl pentylidene]bislithium is added thereto. The polymerization of the isoprene is completed after 30 minutes. Then, 70 grams of butadiene is added, and the polymerization of the butadiene is completed after 30 minutes. Next, to the reaction mixture are added 175 grams of butadiene, 35 grams of styrene and the polar modifier TMEDA with the molar ratio of TMEDA/Li being 1.0, and the reaction is continued for 60 minutes. After the butadiene and styrene are polymerized completely, 3.5 grams of antioxidant (a mixture of Irganox 1010 and ANTIGENE BHT in a weight ratio of 1:1) is added, then the polymer product is recovered by conventional methods. The resultant polymer has a number average molecular weight of $15 \times 10^4$. After being dried, the polymer samples are measured for their structural and mechanical properties by conventional methods and the results are shown in Table 4.

EXAMPLES 23–28

The procedure similar to Example 22 is followed, except that the amounts of the butadiene, isoprene and styrene, and the kind and amount of the polar modifier are changed, so as to prepare pentablock interpolymers Y-B-I-B-Y. The polymerization conditions, the structures and properties obtained are shown in Table 4 as Examples 23–28.

TABLE 4

Polymerization conditions and physical properties of the resulting products

| Examples | 22 | 23 | 24 | 25 | 26 | 27 | 28 |
|---|---|---|---|---|---|---|---|
| S(g) | 35 | 105 | 105 | 35 | 70 | 70 | 70 |
| I(g) | 70 | 45 | 35 | 65 | 30 | 70 | 35 |
| B1(g) | 70 | 60 | 35 | 40 | 40 | 70 | 70 |
| B2(g) | 175 | 140 | 175 | 210 | 210 | 140 | 175 |
| Ai | TMEDA | THF | THF | TMEDA | THF | THF | TMEDA |
| Ai/Li | 1.0 | 6 | 8 | 1.2 | 35 | 40 | 0.5 |
| Cis-1,4-B % in block Y | 18 | 33 | 32 | 16 | 29 | 27 | 25 |
| Trans-1,4-B % in block Y | 30 | 42 | 40 | 27 | 39 | 38 | 35 |
| 1,2-B % in block Y | 52 | 25 | 28 | 57 | 32 | 35 | 40 |
| 1,2-B % in block X | 10 | 10 | 10 | 10 | 10 | 10 | 10 |
| Cis-1,4-B % in block X | 44 | 44 | 44 | 44 | 44 | 44 | 44 |
| Trans-1,4-B % in block X | 46 | 46 | 46 | 46 | 46 | 46 | 46 |
| 1,4-I % in block X | 86 | 85 | 85 | 87 | 86 | 85 | 87 |
| 3,4-I % in block X | 14 | 15 | 15 | 13 | 14 | 15 | 13 |
| Tg (° C.) | −60 | −35 | −55 | −63 | −57 | −45 | −48 |

Note: S is the amount of the styrene, I is the amount of the isoprene, B1 is the amount of the first charge of the butadiene, B2 is the amount of the second charge of the butadiene, Ai is the kind of the polar modifier, Ai/Li is the molar ratio of the polar modifier to the initiator, cis-1, 4-B %, trans-1,4-B %, 1,2-B %, 1,4-I % and 3,4-I % are the same as defined above, Tg is the glass transition temperature. THF is tetrahydrofuran, TMEDA is tetramethyl ethylene diamine.

EXAMPLE 29

Into a 5-liter stainless steel reactor equipped with a stirrer and a heater are added 3.5 liters of cyclohexane and 70 grams of butadiene and 70 grams of isoprene. The reactor is heated to 50° C. and 24.6 ml (0.095 M of solution in toluene) of a difunctional lithium based initiator, 1, 3-phenylene-bis [3-methyl-1-(4-methyl)phenylpentylidene]bislithium is added thereto. The polymerization of the butadiene and isoprene is completed after 30 minutes. Next, to the reaction mixture are added 175 grams of butadiene, 35 grams of styrene and the polar modifier TMEDA with the molar ratio of TMEDA/Li being 1.0, and the reaction is continued for 60 minutes. After the butadiene and styrene are polymerized completely, 3.5 grams of antioxidant (a mixture of Irganox 1010 and ANTIGENE BHT in a weight ratio of 1:1) is added, then the polymer product is recovered by conventional methods. The resultant polymer has a number average molecular weight of $15 \times 10^4$. After being dried, the polymer samples are measured for their structural and mechanical properties by conventional methods and the results are shown in Table 5.

EXAMPLES 30–35

The procedure similar to Example 29 is followed, except that the amounts of the butadiene, isoprene and styrene, and the kind and amount of the polar modifier are changed, so as to prepare heptablock interpolymers Y-I-BI-B-BI-I-Y. The polymerization conditions, the structures and properties obtained are shown in Table 5 as Examples 30–35.

TABLE 5

Polymerization conditions and physical properties of the resulting products

| Examples | 29 | 30 | 31 | 32 | 33 | 34 | 35 |
|---|---|---|---|---|---|---|---|
| S(g) | 35 | 105 | 105 | 35 | 70 | 70 | 70 |
| I(g) | 70 | 45 | 35 | 65 | 30 | 70 | 35 |
| B1(g) | 70 | 60 | 35 | 40 | 40 | 70 | 70 |
| B2(g) | 175 | 140 | 175 | 210 | 210 | 140 | 175 |
| Ai | TMEDA | THF | THF | TMEDA | THF | THF | TMEDA |
| Ai/Li | 1.0 | 6 | 8 | 1.2 | 35 | 40 | 0.5 |
| Cis-1,4-B % in block Y | 18 | 33 | 32 | 16 | 29 | 27 | 25 |
| Trans-1,4-B % in block Y | 30 | 42 | 40 | 27 | 39 | 38 | 35 |
| 1,2-B % in block Y | 52 | 25 | 28 | 57 | 32 | 35 | 40 |
| 1,2-B % in block X | 10 | 10 | 10 | 10 | 10 | 10 | 10 |
| Cis-1,4-B % in block X | 44 | 44 | 44 | 44 | 44 | 44 | 44 |
| Trans-1,4-B % in block X | 46 | 46 | 46 | 46 | 46 | 46 | 46 |
| 1,4-I % in block X | 86 | 85 | 85 | 87 | 86 | 85 | 87 |
| 3,4-I % in block X | 14 | 15 | 15 | 13 | 14 | 15 | 13 |
| Tg (° C.) | −59 | −34 | −54 | −62 | −56 | −44 | −47 |

Note: S is the amount of the styrene, I is the amount of the isoprene, B1 is the amount of the first charge of the butadiene, B2 is the amount of the second charge of the butadiene, Ai is the kind of the polar modifier, Ai/Li is the molar ratio of the polar modifier to the initiator, cis-1, 4-B %, trans-1,4-B %, 1,2-B %, 1,4-I % and 3,4-I % are the same as defined above, Tg is the glass transition temperature. THF is tetrahydrofuran, TMEDA is tetramethyl ethylene diamine.

Property Evaluation:

The loss angle tan delta at 0° C. of the present multiblock interpolymer obtained in the above Example 13 is determined as 0.217; its loss angle tan delta at 60° C. is determined as 0.064. The ratio of 0° C. tan delta to 60° C. tan delta of the present rubber materials is calculated as 3.39. Such ratio value in '148 patent is calculated as 2.35. Clearly, the present inventive rubber materials have much better combination of low rolling resistance and good wet skid resistance. Also, it is well known in that art that there are much more alternative means than those for low rolling resistance to modify the wet skid resistance of the tires, such as design of tread pattern. That is, in comparison with the wet skid resistance, it has traditionally been much more difficult to improve a tire's rolling resistance. From the above data, the rolling resistance property of the present rubber materials is greatly improved, while its wet skid property still well meets the requirement of practical use.

From FIG. 1 showing DSC chart of the multiblock interpolymer obtained in Example 13, it is clearly seen that such multiblock interpolymer exhibits wide glass transition zone that is indicative of excellent integrated rubber.

The rubber materials of the present invention are an energy-saving integrated rubber with excellent comprehensive properties, which means broad commercial prospects.

What is claimed is:

1. A multiblock interpolyer having the following symmetric structure:

Y-X-Y wherein

Y represents a block of a random copolymer of conjugated diene and monovinyl aromatic monomer, wherein the content of the 1,2- or 3,4-addition polymerization structure of the conjugated diene in block Y is from 10 to 50 percent by weight, based on the total weight of the units derived from the conjugated diene in block Y; and X represents a block of butadiene homopolymer, a block of isoprene homopolymer, or a block of butadiene/isoprene copolymer, wherein the content of 3, 4-addition polymerization structure of isoprene in block X is, based on the total weight of the units derived from the isoprene in block X, from 6 to 20 percent by weight, and/or the content of 1, 2-addition polymerization structure of butadiene in block X is, based on the total weight of the units derived from the butadiene in block X, from 6 to 20 percent by weight.

2. The multiblock interpolymer according to claim 1, wherein said multiblock interpolymer has a number average molecular weight of from $5 \times 10^4$ to $35 \times 10^4$, and the weight ratio of the total blocks Y to block X is from 10/90 to 90/10.

3. The multiblock interpolymer according to claim 1, wherein block Y is a block of a random copolymer of butadiene and styrene, the content of the styrene in block Y is from 10 to 50 percent by weight based on the total weight of block Y, and the content of the butadiene is from 50 to 90 percent by weight based on the total weight of block Y.

4. The multiblock interpolymer according to claim 1, wherein block X is a block selected from the group consisting of the following structures:

-B-

-I-

-I-B-I-

-B-I-B- and

-I-BI-B-BI-I-, wherein B represents a block of butadiene homopolymer, I represents a block of isoprene homopolymer, and BI represents a block of tapered copolymer of butadiene and isoprene; and when block X is -I-B-I-, -B-I-B- or-I-BI-B-BI-I-, the weight ratio of butadiene to isoprene is from 10/90 to 90/10.

5. A process for the preparation of a multiblock interpolymer according to claim 1, comprising the steps of:
   a) anionic polymerizing butadiene and/or isoprene in a non-polar hydrocarbon solvent in presence of a difunctional lithium based initiator, till the butadiene and/or isoprene are polymerized completely, to form block X as defined in claim 1; and then
   b) charging a mixture of conjugated diene and monovinyl aromatic monomer into the reaction mixture obtained in step a) above, continuing the anionic polymerization in presence of a polar modifier till the polymerization is complete, to form block Y as defined in claim 1.

6. The process according to claim 5, wherein step a) comprises
   (1) anionic polymerizing butadiene in a non-polar hydrocarbon solvent in presence of a difunctional lithium based initiator, till the butadiene is polymerized completely, to form block B, a block of butadiene homopolymer; or
   (2) anionic polymerizing isoprene in a non-polar hydrocarbon solvent in presence of a difunctional lithium based initiator, till the isoprene is polymerized completely, to form block I, a block of isoprene homopolymer; or
   (3) anionic polymerizing butadiene in a non-polar hydrocarbon solvent in presence of a difunctional lithium based initiator, till the butadiene is polymerized completely, then adding isoprene and continuing the anionic polymerization till the isoprene is polymerized completely, to form block -I-B-I-; or
   (4) anionic polymerizing isoprene in a non-polar hydrocarbon solvent in presence of a difunctional lithium based initiator, till the isoprene is polymerized completely, then adding butadiene and continuing the anionic polymerization till the butadiene is polymerized completely, to form block -B-I-B-; or
   (5) anionic polymerizing a mixture of butadiene and isoprene in a non-polar hydrocarbon solvent in presence of a difunctional lithium based initiator, till the butadiene and isoprene are polymerized completely, to form block -I-BI-B-BI-I-.

7. The process according to claim 5, wherein said difunctional lithium based initiator is at least one selected from the group consisting of:
   bislithiums derived from dihalogenated alkanes and oligomeric bislithiums thereof represented by the following general formulae:
   LiRLi and Li(DO)$_n$R(DO)$_n$Li
   wherein R represents an alkylene group having from 4 to 10 carbon atoms, DO represents a repeating unit derived from a conjugated diene having from 4 to 8 carbon atoms or mixtures thereof, n is a number of from 2 to 8;
   bislithiums of naphthalene selected from the group consisting of dilithionaphthalene and α-methyl-dilithionaphthalene; and
   bislithiums derived from diene compounds and oligomeric bislithiums thereof selected from the group consisting of 1,3-phenylene-bis(3-methyl-1-(4-methyl) phenyl-pentylidene)bislithium, 1,3-phenylene-bis(3-methyl-1-(4-methyl)phenylpentylidene)butadiene oligomer-bislithium,1,3-phenylene-bis(3-methyl-1-(4-methyl)phenylpentylidene)isoprene oligomer-bislithium, 1,4-phenylene-bis(3-methyl-1-(4-methyl) phenylpentylidene)bislithium, 1,4-phenylene-bis(3-methyl-1-(4-methyl)phenylpentylidene)butadiene oligomer-bislithium and 1,4-phenylene-bis(3-methyl-1-(4-methyl) phenylpentylidene)isoprene oligomer-bislithium.

8. The process according to claim 5, wherein said non-polar hydrocarbon solvent is selected from the group consisting of benzene, toluene, ethylbenzene, xylene, pentane, hexane, heptane, octane, cyclohexane, mixed xylene, raffinate oil and any mixture thereof.

9. The process according to claim 5, wherein said polar modifier is at least one selected from the group consisting of:
   oxygen-containing compounds selected from the group consisting of diethyl ether, tetrahydrofuran, a compound represented by $R^1OCH_2CH_2OR^2$ and $R^1OCH_2CH_2OCH_2CH_2OR^2$, wherein $R^1$ and $R^2$, being the same or different, represent an alkyl having from 1 to 6 carbon atoms, and crown ether; nitrogen-containing compounds selected from the group consisting of triethylamine, tetramethyl ethylene diamine, and dipiperidino ethane;
   phosphorus-containing compounds; and
   metal alkoxides represented by ROM, wherein R represents an alkyl having from 1 to 6 carbon atoms, O represents an oxygen atom, and M represents a metal cation.

10. The multiblock interpolymer according to claim 1, wherein said multiblock interpolymer has a number average molecular weight of from $10\times10^4$ to $25\times10^4$, and the weight ratio of the total blocks Y to block X is from 30/70 to 70/30.

11. The multiblock interpolymer according to claim 1, wherein the content of the styrene in block Y is from 15 to 35 percent by weight based on the total weight of block Y, and the content of the butadiene is from 65 to 85 percent by weight based on the total weight of block Y.

12. The multiblock interpolymer according to claim 4, wherein block X is a block of butadiene/isoprene copolymer, and the weight ratio of butadiene to isoprene is from 30/70 to 70/30.

13. The multiblock interpolymer according to claim 1, wherein the content of 3,4-addition polymerization structure of isoprene in block X is, based on the total weight of the units derived from the isoprene in block X, from 10 to 20 percent by weight, and the content of 1,2-addition polymerization structure of butadiene in block X is, based on the total weight of the units derived from the butadiene in block X, from 10 to 20 percent by weight.

14. The process according to claim 8, wherein said non-polar hydrocarbon solvent is selected from the group consisting of hexane, cyclohexane and raffinate oil.

* * * * *

UNITED STATES PATENT AND TRADEMARK OFFICE
CERTIFICATE OF CORRECTION

PATENT NO.   : 6,777,499 B2                              Page 1 of 1
DATED        : August 17, 2004
INVENTOR(S)  : Li et al.

It is certified that error appears in the above-identified patent and that said Letters Patent is hereby corrected as shown below:

Title page,
Item [57], ABSTRACT,
Line 14, delete "of the both two kinds", insert -- of both of the two kinds --.

Column 15,
Line 64, delete "interpolyer", insert -- interpolymer --.

Column 16,
Lines 1-2, delete "wherein
             Y represents" insert -- wherein Y represents --.

Signed and Sealed this

Twentieth Day of September, 2005

JON W. DUDAS
*Director of the United States Patent and Trademark Office*